(No Model.) 3 Sheets—Sheet 1.

C. E. CANDEE.
LOCK.

No. 478,781. Patented July 12, 1892.

WITNESSES
Edward S. Berrall
John J. F. O'Connor

INVENTOR
Charles Erwin Candee

THE NORRIS PETERS CO., PHOTO-LITHO., WASHINGTON, D. C.

(No Model.) 3 Sheets—Sheet 2.
C. E. CANDEE.
LOCK.
No. 478,781. Patented July 12, 1892.
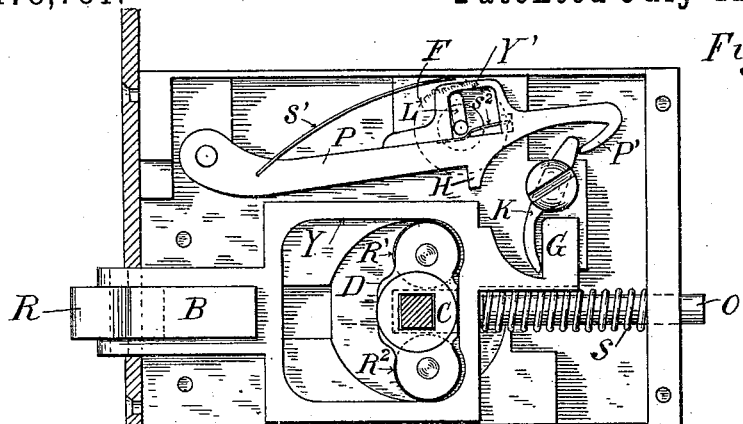
Fig. 16.
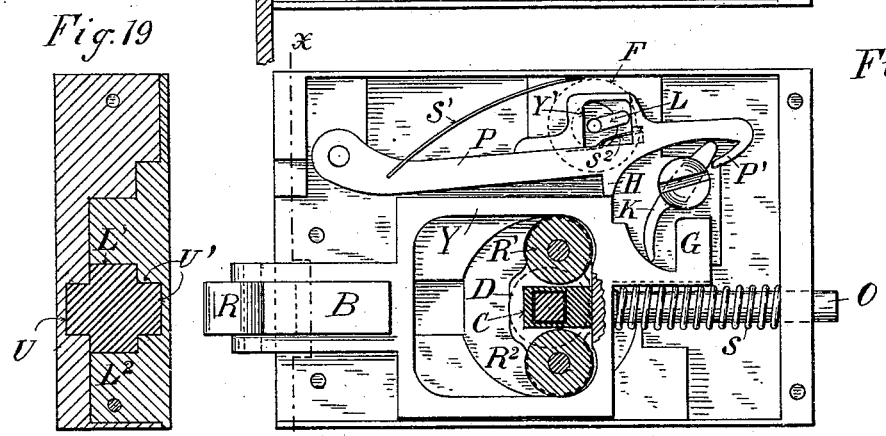
Fig. 19.
Fig. 17.
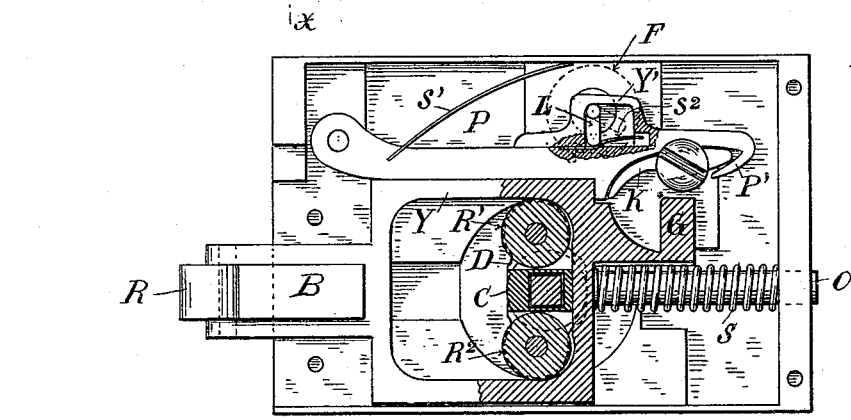
Fig. 18.
WITNESSES
Edward S. Berrall
John J. F. O'Connor
INVENTOR
Charles Erwin Candee (No Model.) 3 Sheets—Sheet 3.

C. E. CANDEE.
LOCK.

No. 478,781. Patented July 12, 1892.

WITNESSES
Edward S. Berrall.
John J. F. O'Connor.

INVENTOR
Charles Erwin Candee

United States Patent Office.

CHARLES ERWIN CANDEE, OF NEW YORK, N. Y.

LOCK.

SPECIFICATION forming part of Letters Patent No. 478,781, dated July 12, 1892.

Application filed September 22, 1890. Serial No. 365,728. (No model.)

*To all whom it may concern:*

Be it known that I, CHARLES ERWIN CANDEE, a citizen of the United States, residing in the city, county, and State of New York, have invented a new and useful Improvement in Door-Locks, of which the following is a specification.

My invention relates to a new kind of reversible door-lock in which the catch-bolt is also a lock-bolt, and in which anti-friction devices relieve the bolt in its operative movements in catching and uncatching.

The practical objects of my improvement will be stated in whole or in part in the body of the specification, and the nature of the invention will be found stated in the several claims appended thereto.

I attain the objects of my invention by the mechanism and its arrangements as illustrated in the accompanying drawings, in which—

Figure 1:
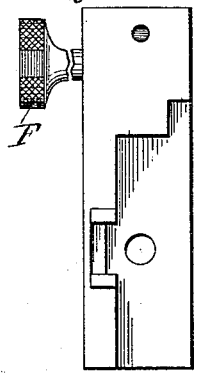
Figure 2:
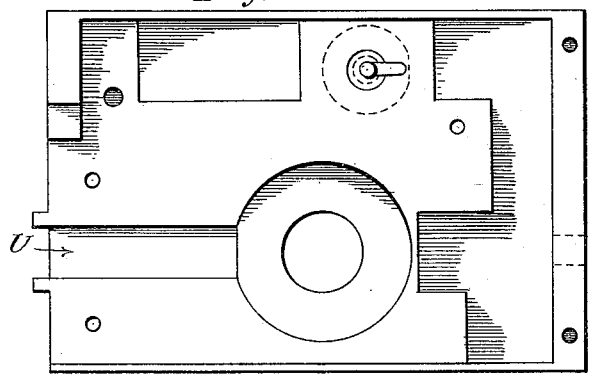
Figure 5:
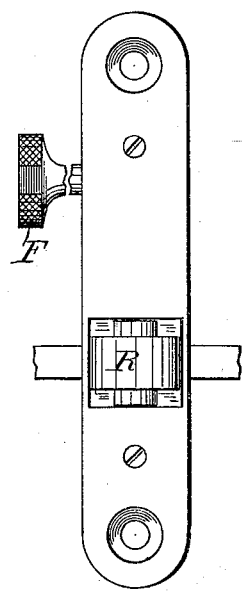
Figure 3:
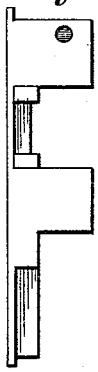
Figure 4:
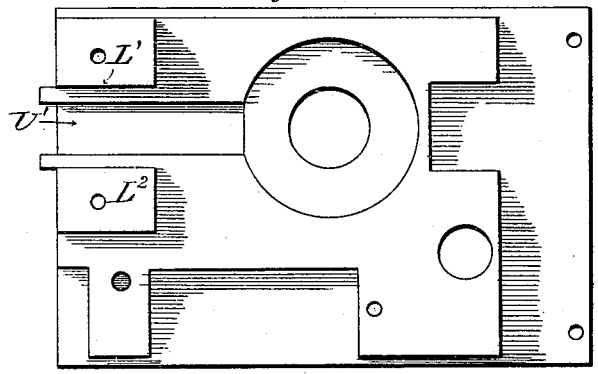
Figure 6:
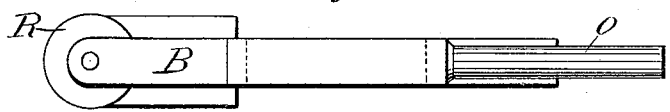
Figure 7:
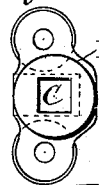
Figure 8:
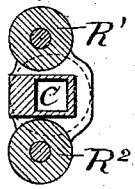
Figure 11:
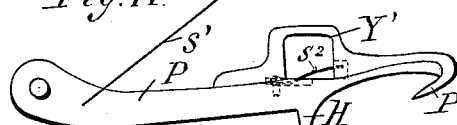
Figure 9:
Figure 10:
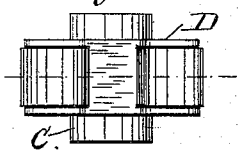
Figures 12, 13:
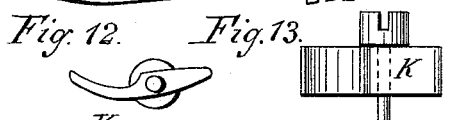
Figure 14:
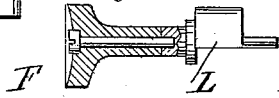
Figure 15:
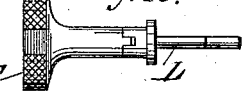
Figure 22:
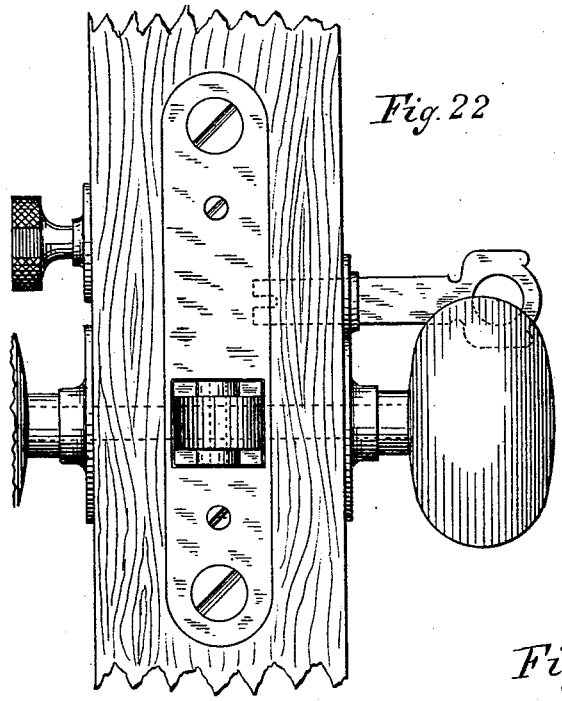
Figure 20:
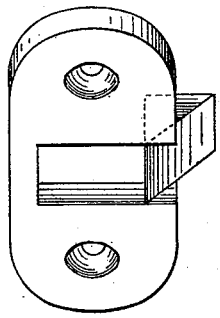
Figure 21:
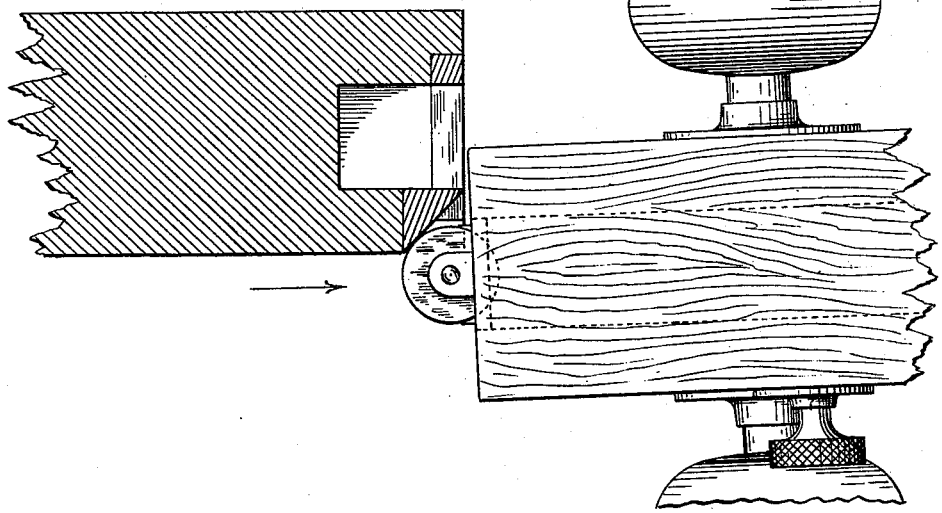

Figures 1 and 2, respectively, are inside and front end views of the lock frame, case, or plate. Figs. 3 and 4, respectively, are similar views of the lock frame, case, or plate cover. Fig. 5 is a vertical front end view of the lock. Fig. 6 is a side view of the catch and lock bolt. Fig. 7 is a top view of the double-end cam operated by the knob-spindle. Fig. 8 is a sectional view of the same. Figs. 9 and 10 are opposite side views of the same. Fig. 11 is a side view of a locking pawl or lever. Fig. 12 is a bottom view of a key-tumbler, and Fig. 13 is a side view of the same. Figs. 14 and 15 are respectively part sectional and top views of a pawl or lever lifting cam and handle or thumb-piece. Figs. 16, 17, and 18 are side views of the lock frame or plate and the assembled parts in different positions with the lock-plate cover removed, the last two partly in section. Fig. 19 is a sectional view on lines $xx$ of Fig. 17. Fig. 20 is a perspective view of the jamb-escutcheon. Fig. 21 is a part sectional view of the door-jamb, door, and mortised lock in position for the operation of the catch-bolt by closing the door, or in position as when the door has been opened sufficiently far to release the catch-bolt, and Fig. 22 is an end view of a mortise-lock, key, and other parts of the lock in position in the door.

Similar letters relate to similar parts throughout the several views.

The combined catch and lock bolt B is provided with a yoke Y, in which the double-end roller-cam D moves to operate the bolt. The bolt B is provided with the anti-friction roller R, secured in any ordinary way at its front end so as to revolve freely therein; but is preferably located in a concave recess conforming to the roller, and at its rear end has a guide-rod O, which is supported in a hole in the back end of the lock frame, case, or plate, and is surrounded by a spiral spring for operating the catch-bolt, bearing at one end on the bolt-yoke Y and at the other end on the adjacent end of the lock frame, case, or plate.

The cam D consists of the spindle-socket C, provided with extensions in which are secured the anti-friction rollers $R'$ and $R^2$, and has the outside of the spindle-socket cut away on one side—say about a sixteenth of an inch—more than on the other side. The function of the cam D is to operate the bolt when it acts as a catch-bolt, and for that purpose it may be revolved continuously in either direction at will. When that side of the spindle-socket most cut away is turned so as to be adjacent to the back side of the yoke Y, and the pawl or lever P is in control of the spring $S'$, the catch-bolt is forced by the spring S into its most advanced position and the lever P is tripped into position to lock the bolt B automatically. The bolt B is further provided with a lug G, with which the lower end of the key-tumbler K makes contact, as shown in Fig. 16, for the purpose of sliding back the catch and lock bolt.

P is a pawl or lever fulcrumed at the front end, as shown. It is provided with two springs $S'$ and $S^2$. The spring $S'$ presses the lever P toward the bolt B, and the spring $S^2$, located in the pawl or cam yoke $Y'$, has the function of holding the cam L in its dependent vertical position in its yoke or seat when placed therein and also of preventing its reaching that position except when it is purposely placed there. The lever P has on its under side a lug or shoulder H, which is located in such relation to the bolt B as to permit the bolt to move freely when the lever is elevated, as shown in Fig. 16, to slide on the top of the yoke or bolt when the parts are located as shown in Fig. 17, and so as to lock and hold the bolt B when the parts are in the position shown in Fig. 18.

The cam L, provided with the thumb-piece F, moves in the yoke Y' for the purposes of either lifting the lever P, as shown in Fig. 16, leaving the lever P free to move upward or downward, as shown in Fig. 17, or of locking the lever in position to lock the bolt B, as shown in Fig. 18. These various functions are performed by this cam as it is given the proper quarter-turn, the guide for which may be the flat part of the thumb-piece F, which is presented on its top side when the cam L and lever P are elevated, on its side when they are in the positions shown in Fig. 17, and on its under side when they are in the positions shown in Fig. 18. When the lever P and cam L are in the positions respectively shown in Figs. 16 and 18, the key-tumbler K has no control whatever over the lever P; but in the first instance—that is, as shown in Fig. 16—the key-tumber K may be used to move the bolt B against the resistance of the spring S, and in that case the bolt B may be operated either by the key or by the knobs and lock-spindle, at will. When the parts are in the position shown in Fig. 17, the key-tumbler K is free to operate both the bolt B and the lever P, sliding the former and lifting the latter from its bearing on the bolt. The same is true when the cam L is in the position shown in Fig. 17 and the other parts in the positions shown in Fig. 18.

The lever P is provided at one end with a stop P', so formed as to leave a recess between itself and the lever proper, into which the upper end of the key-tumbler K retreats, as shown in Fig. 18. In the absence of the stop P' it is evident that the tumbler K will perform a portion of its functions in relation to the lever P and bolt B. Of course when the parts are in the positions shown in Fig. 16, the upper end of the key-tumbler clears the under side of the lever as the lower end retreats the bolt B. The bolt B, as shown, moves at its front end in the guides U U', formed in the lock plate or frame and in the cover, respectively, assisted by the lugs L' L²; but of course it is evident that the bolt B may be held in place by other known suitable means.

The yoke Y gives freedom to the cam D to move in performing its functions. It is stronger when complete; but as either the top or bottom side connects the two ends of the bolt B, one of them may be omitted without affecting the action of the cam D, since it makes no necessary contact therewith.

Since the bolt B has on its front end for a striking and bearing surface the roller R, and also, since the roller R is capable of moving in opposite directions, the lock shown and described may be used in a door opening to the right or to the left or swinging in either direction at will, and that the lock will operate in all its parts equally well in the different positions mentioned. The usual friction upon the beveled front of a catch-bolt is avoided in this invention by the use of the roller R, which will roll instead of rubbing on the beveled part of the jamb-escutcheon; but the roller R may be omitted or, rather, have substituted therefor the usual beveled catch-bolt end, and in that case the other parts of the lock will still operate effectively and in the manner heretofore described.

Since the lever P with the lug or shoulder H is held in position when locking the bolt B by the cam L at will, this lock cannot be picked from the outside by the introduction of any device into or through the latch-key hole, the key-tumbler being placed entirely out of function when the lever P and cam L are in the locking positions in relation to each other and to the bolt B.

When the shoulder or lug H is allowed to ride on the upper side of the yoke Y, the door may be instantly locked by the dropping of the part H into the locking position, the turning of the knob on and from the outside of the door leaving the parts in such positions that while the knob and spindle will not draw back the bolt B and the door is therefore locked, the lever P may be lifted by means of the key and key-tumbler K, which will also draw back the bolt B after thus releasing it from the control of the lever P.

When the ordinary bevel-ended catch-bolt is used instead of the roller-ended catch-bolt shown, of course the lock is not reversible without change or modification. I do not, therefore, desire to limit my invention in respect of other parts of the lock strictly or absolutely to associated use with the roller-ended or automatically anti-friction bolt B.

This lock may be used as an outside lock instead of a mortise-lock by simply providing the ordinary means of attaching the same to the outside of the door, and also as a reversible lock when thus attached.

It is to be observed that the center of the knob, spindle-socket, and bearings is not in line with the centers of the two rollers R' R², and that the opposite bearing-surfaces of the spindle-socket, against which the back side of the yoke Y alternately rests are both of them in line with the periphery of the two rollers R' R² upon opposite sides. This arrangement of parts permits the automatic action of the lever P as the shoulder H drops into position for the purpose of locking the bolt B. It is also to be observed that when in opening or closing a door provided with a lock having a bolt with the acti-friction roller described is moved to such a position that the line passing longitudinally through the bolt and through the center of the roller has passed the inner edge of the beveled surface of the jamb-escutcheon the action of the spring on the bolt and the roller will aid the opening or the closing of the door, as the case may be. In other words, the roller and the spring aid each other in seating the bolt in the socket of the jamb-escutcheon, and also to some extent aid in the opening or closing of the door, as the case may be.

The double-ended cam is more complete, and its action is more immediate and direct than that of a single cam would be; but one cam might be omitted, leaving the rest of the construction the same, without changing the main characteristics of this invention.

I do not desire to limit the location of the different parts of the lock to the precise positions shown in the drawings; and particularly as to the location of the key-tumbler and its seat I do not confine my invention to the precise positional relations shown; and in actual manufacture I prefer to locate the key-hole either directly above the knob or directly below it in the usual way.

When the cam L is in the dependent position shown in Fig. 18, it becomes a positive locking-cam. When reversed and occupying the position shown in Fig. 16, it becomes a positive unlocking-cam; and when placed in the intermediate position or positions between the two, one of which is shown in Fig. 17, it becomes a freeing-cam. When the metal on the outside of the spindle-socket is cut away more on one side than on the other, as shown in Figs. 8, 16, 17, and 18, the spindle-socket, in addition to its socket-function, becomes an eccentric stop for the bolt in the sense of stopping the movement of the bolt nearer the center of the socket when that side of the socket is presented to the bolt which is most cut away than when the other side is presented thereto which is not so much cut away. The tumbler K is not a removable key, but unremovable in the sense of being a part of the lock itself, and is operated from the outside in any usual way. As shown, it is provided with the slit in the head of the stem on which it is secured and turns like the channel or groove in the head of a screw, and may therefore be operated by a suitable screw-driver or by any other instrument provided with a similar termination; but as the means of operating the tumbler forms no part of my invention as herein claimed, it is unnecessary to show any other particular form of key or means of operating the tumbler, which itself is practically unremovable, as a part of the lock.

I claim as my invention—

1. In locks, an automatic locking-lever, in combination with the positive locking and positive unlocking and freeing cam L, a bolt B, and a tumbler K, one arm of which engages the locking-lever to disengage the same, and the other arm of which engages the bolt B to retreat the same after it is unlocked, substantially as shown and described.

2. In locks, an automatic locking-pawl or lever, in combination with a positive locking and positive unlocking and freeing cam L, a bolt B, an unremovable tumbler K, engaging the locking pawl or lever to disengage the same and also the bolt B to retreat the same independently of the knob and spindle, and an eccentric spindle-socket stop stopping the bolt in either of two positions at will, one of which is a locking position in relation to the locking pawl or lever.

3. In locks, an automatic locking pawl or lever, in combination with a positive locking and positive unlocking and freeing cam L, a bolt B, an unremovable tumbler K, engaging the locking pawl or lever to disengage the same and also the bolt B to retreat the same independently of the knob and spindle, and an eccentric spindle-socket stop stopping the bolt in either one of two positions at will, one of which is a locking position in relation to the locking pawl or lever, the spindle-socket being provided with the rollers $R'$ $R^2$ for retreating the bolt independently of the tumbler.

4. The locking pawl or lever P, fulcrumed at one end and provided with the stop $P'$, in combination with the tumbler K, one arm of which bears upon the other end of the locking pawl or lever P for the purpose of lifting and disengaging the same, and also with the stop $P'$, and also in combination with the cam L, arranged to lift, lock, or free the locking pawl or lever at will.

5. The locking pawl or lever P, fulcrumed at one end and provided with the stop $P'$ and with the springs $S'$ $S^2$, in combination with a tumbler K, one arm of which bears upon the locking pawl or lever P for the purpose of lifting and disengaging the same, and also with the stop $P'$, and also in combination with the cam L, arranged to lift, lock, or free the locking pawl or lever at will.

6. The locking pawl or lever P, fulcrumed at one end and provided with the stop $P'$ and the springs $S'$ $S^2$, in combination with a tumbler K, one arm of which bears upon the locking pawl or lever P for the purpose of lifting and disengaging the same, and also in combination with the cam L, arranged to lift, lock, or free the locking pawl or lever at will, and with a lock-bolt.

CHARLES ERWIN CANDEE.

Witnesses:
EDWARD S. BERRALL,
JOHN J. F. O'CONNOR.